United States Patent
Shi et al.

(10) Patent No.: US 10,240,547 B2
(45) Date of Patent: Mar. 26, 2019

(54) FUEL INJECTION CONTROL DEVICE

(71) Applicant: Hitachi Automotive Systems, Ltd., Hitachinaka-shi, Ibaraki (JP)

(72) Inventors: Haoyun Shi, Tokyo (JP); Yuuki Okuda, Tokyo (JP); Masahiro Toyohara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/579,816

(22) PCT Filed: Jun. 1, 2016

(86) PCT No.: PCT/JP2016/066092
§ 371 (c)(1),
(2) Date: Dec. 5, 2017

(87) PCT Pub. No.: WO2016/203941
PCT Pub. Date: Dec. 22, 2016

(65) Prior Publication Data
US 2018/0156147 A1 Jun. 7, 2018

(30) Foreign Application Priority Data
Jun. 19, 2015 (JP) .................................. 2015-123394

(51) Int. Cl.
*F02D 41/20* (2006.01)
*F02D 41/30* (2006.01)

(52) U.S. Cl.
CPC ......... *F02D 41/20* (2013.01); *F02D 41/3005* (2013.01); *F02D 2041/2055* (2013.01)

(58) Field of Classification Search
CPC .... F02D 41/20; F02D 41/3005; F02D 41/401; F02D 41/008; F02D 2041/2055; F02D 2041/2062; F02M 65/005
(Continued)

(56) References Cited

U.S. PATENT DOCUMENTS

2012/0318883 A1 12/2012 Kusakabe et al.
2016/0237937 A1* 8/2016 Kusakabe ............... F02D 41/20
2016/0252037 A1 9/2016 Katsurahara

FOREIGN PATENT DOCUMENTS

| JP | 2003-314338 A | 11/2003 |
| JP | 2013-2400 A | 1/2013 |
| JP | 2015-75087 A | 4/2015 |

OTHER PUBLICATIONS

International Search Report (PCT/ISA/210) issued in PCT Application No. PCT/JP2016/066092 dated Aug. 23, 2016 with English translation (Two (2) pages).
(Continued)

*Primary Examiner* — Hai Huynh
(74) *Attorney, Agent, or Firm* — Crowell & Moring LLP

(57) ABSTRACT

Provided is a fuel injection control device capable of accurately detecting a valve opening delay time of a fuel injection valve, and implementing high-precision minute injection control. A valve opening delay time of a fuel injection valve is estimated on the basis of a plurality of valve closing delay times obtained when the fuel injection valve is operated with injection pulse widths that are different injection pulse widths from each other and with which the fuel injection valve is in an intermediate lift state.

12 Claims, 13 Drawing Sheets

(58) Field of Classification Search
USPC ...... 123/472, 478, 490; 701/105; 73/114.47, 73/114.49
See application file for complete search history.

(56) References Cited

OTHER PUBLICATIONS

Japanese-language Written Opinion (PCT/ISA/237) issued in PCT Application No. PCT/JP2016/066092 dated Aug. 23, 2016 (Three (3) pages).

* cited by examiner

FUEL INJECTION CONTROL DEVICE

TECHNICAL FIELD

The present invention relates to a fuel injection control device.

BACKGROUND ART

In a fuel injection technology for implementing multi-stage injection, a fuel injection control device is known that corrects an individual difference of a fuel injection valve with respect to a minute injection quantity (for example, see PTL 1). In this conventional fuel injection control device, injection quantity accuracy is increased by suppressing injection quantity fluctuation with respect to a main injection quantity during multistage injection that performs minute pilot injection before main injection.

CITATION LIST

Patent Literature

PTL 1: JP 2003-314338 A

SUMMARY OF INVENTION

Technical Problem

In the conventional fuel injection control device as described in PTL 1 above, an elapsed time from a rise time of a fuel injection valve (injector) drive signal to an actual valve opening time, is detected as a valve opening delay time. However, motion of the fuel injection valve is not abrupt during valve opening, and noise is detected together with an inflection point of current, so that it is difficult to obtain with high accuracy the actual valve opening time of the fuel injection valve. Also, in a fuel injection valve having a current characteristic without the inflection point, the actual valve opening time cannot be obtained from the current characteristic; as a result, there is a problem that the valve opening delay time cannot be detected.

The present invention has been made in view of the above problem, and it is an object to provide a fuel injection control device capable of accurately detecting the valve opening delay time of the fuel injection valve and implementing high-precision minute injection control.

Solution to Problem

To solve the above problem, the fuel injection control device according to the present invention is a fuel injection control device with which a fuel injection valve is controlled in an intermediate lift state, and the fuel injection control device estimates a valve opening delay time of the fuel injection valve on the basis of a plurality of valve closing delay times, the plurality of valve closing delay times being obtained when the fuel injection valve is operated with injection pulse widths that are different injection pulse widths from each other and with which the fuel injection valve is in the intermediate lift state.

Advantageous Effects of Invention

According to the present invention, the valve opening delay time of the fuel injection valve is estimated on the basis of a plurality of valve closing delay times, the plurality of valve closing delay times being obtained when the fuel injection valve is operated with the injection pulse widths that are different injection pulse widths from each other and with which the fuel injection valve is in the intermediate lift state, whereby, for example, for the fuel injection valve that performs minute injection using the intermediate lift state, the valve opening delay time of the fuel injection valve can be reliably and accurately estimated, and injection quantity accuracy during minute injection can be improved.

The problems, configurations, and effects other than those described above will be clarified from description of embodiments below.

BRIEF DESCRIPTION OF DRAWINGS

FIG. 4A illustrates a state immediately after valve opening, FIG. 4B illustrates an intermediate lift state, and FIG. 4C illustrates a maximum lift state.

DESCRIPTION OF EMBODIMENTS

Hereinafter, embodiments of an internal combustion injection control device according to the present invention will be described with reference to the drawings.

[First Embodiment]

Figure 1:
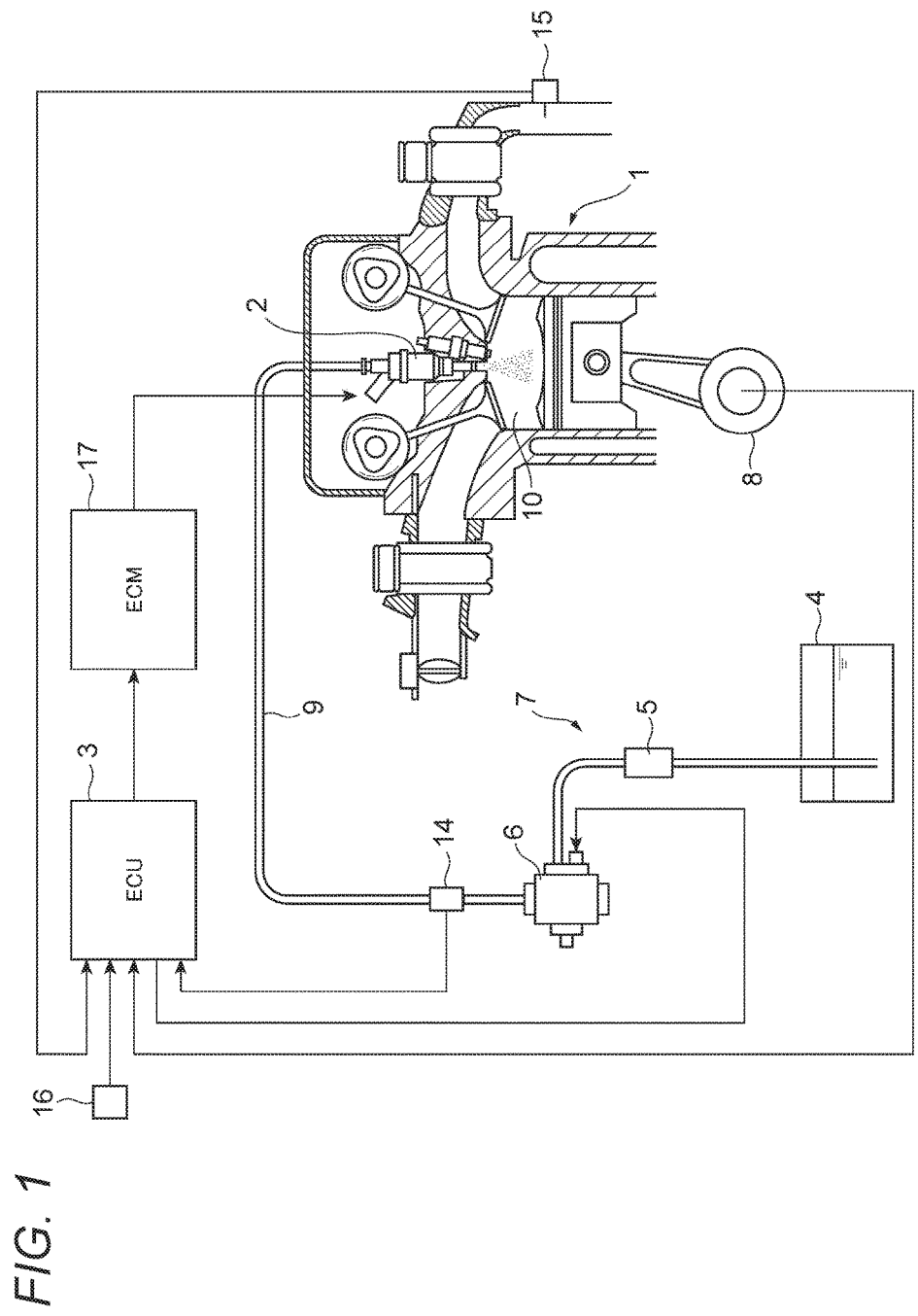
FIG. 1 is an overall configuration diagram illustrating a schematic configuration of an internal-combustion engine system to which a first embodiment of a fuel injection control device according to the present invention is applied.

FIG. 1 illustrates a schematic configuration of an internal-combustion engine system to which a first embodiment of a fuel injection control device according to the present invention is applied.

As illustrated, a present system mainly includes an internal-combustion engine (hereinafter, referred to as an engine) 1, a fuel supply device 7, an engine control module (ECM) 17 for driving a fuel injection valve 2 of the engine 1, and an engine control unit (ECU) (fuel injection control device) 3. The fuel supply device 7 supplies fuel from a fuel tank 4 by a low pressure fuel pump 5 to the fuel injection valve 2 disposed in the engine 1 via a fuel line 9, the fuel being primarily pressurized to be regulated to a constant pressure by a fuel pressure regulator (not illustrated) and being secondarily pressurized to a higher pressure by a high pressure fuel pump 6. The fuel supply device 7 injects a predetermined amount of fuel from the fuel injection valve 2 into a combustion chamber 10. The ECU 3 takes in signals from various sensors such as a crank angle sensor 8, a fuel temperature sensor 14, an exhaust temperature sensor 15, and an atmospheric pressure sensor 16, and performs calculation necessary for drive control (valve opening control and valve closing control) of the fuel injection valve 2 according to an operating condition of the engine 1.

Figure 2:
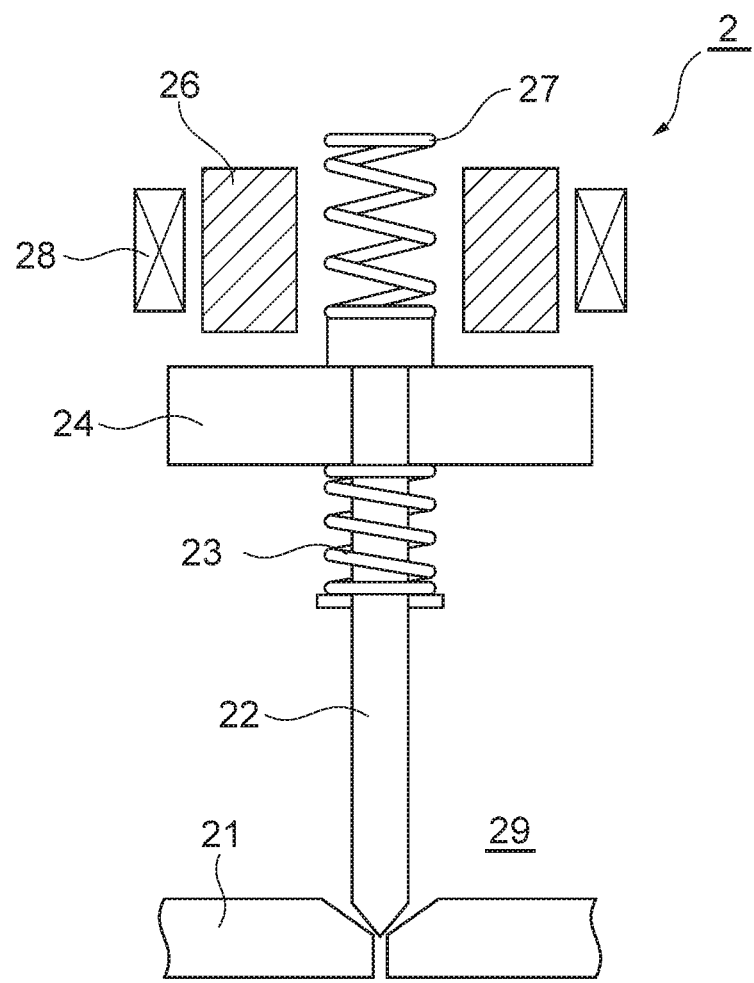
FIG. 2 is a schematic diagram schematically illustrating an internal configuration of a fuel injection valve illustrated in FIG. 1.

FIG. 2 is a schematic diagram schematically illustrating an internal configuration of the fuel injection valve 2 illustrated in FIG. 1.

The fuel injection valve 2 basically includes a valve seat 21, a valve body 22, an anchor (mover) 24, a zero spring 23 provided between the anchor 24 and the valve body 22, a coil 28 by which electromagnetic force is generated, a magnetic core 26 to be magnetized, and a spring 27 that urges the valve body 22 in a valve closing direction.

Pressure of the fuel supplied from the upper portion of the fuel injection valve 2 and a load of the spring 27 causes the valve body 22 to be in contact with the valve seat 21. When the coil 28 is supplied with a drive current (excitation current), magnetic flux is generated between the anchor 24 and the magnetic core 26, and magnetic attraction force is generated. When the magnetic attraction force exceeds a sum of the pressure of the fuel and force due to the load of the spring 27, the anchor 24 moves in a valve opening direction, and the anchor 24 and the magnetic core 26 are in contact with each other (this state is referred to as a valve opening completion state). As a result, the valve body 22 is separated from the valve seat 21, and the fuel is injected from an inside of a fuel injection valve chamber 29 into the combustion chamber 10.

When electrification to the coil 28 is shut off, the magnetic flux generated in a magnetic circuit disappears, and the magnetic attraction force also disappears. The valve body 22 starts valve closing operation due to the pressure of the fuel and the load of the spring 27, and the valve body 22 and the anchor 24 move together to perform valve closing operation, and then the valve body 22 is in contact with the valve seat 21 and the fuel injection stops (this state is referred to as a valve closing completion state). Incidentally, the fuel injection valve 2 illustrated in FIG. 2 is configured in a nozzle holder and a yoke, or the like (not illustrated); however, configuration not illustrated does not characterizes the present invention.

Figure 3:
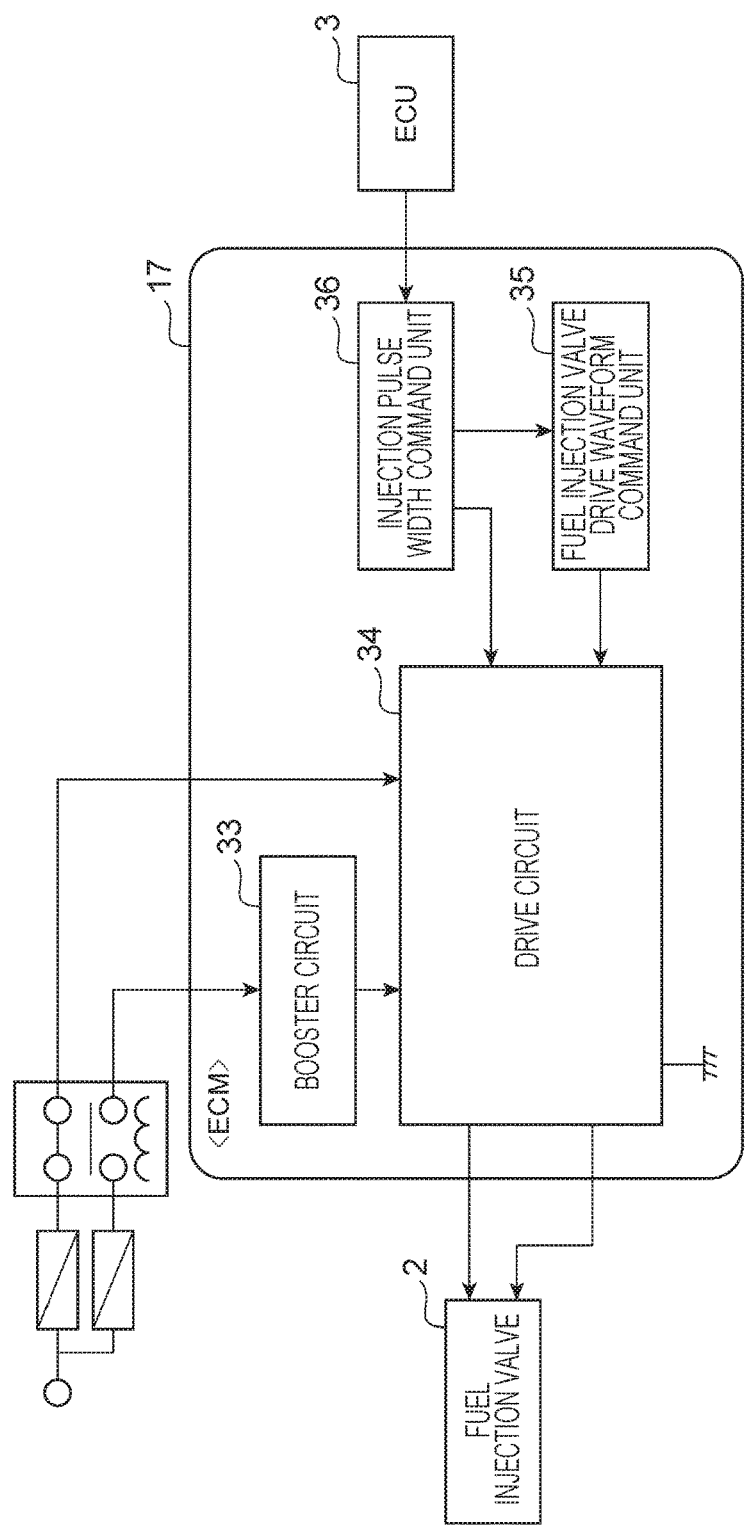
FIG. 3 is a block diagram illustrating an internal configuration of an ECM illustrated in FIG. 1.

FIG. 3 is a block diagram illustrating an internal configuration of the ECM 17 illustrated in FIG. 1.

The ECM 17 includes a booster circuit 33, a drive circuit 34, a fuel injection valve drive waveform command unit 35, an injection pulse width command unit 36, and control software stored therein. A battery voltage is supplied to the booster circuit 33 via a drive relay, and the booster circuit 33 boosts the battery voltage to generate a high voltage, and supplies the high voltage and the battery voltage to the drive circuit 34. The ECU 3 takes in the signals from the various sensors such as the crank angle sensor 8, the fuel temperature sensor 14, the exhaust temperature sensor 15, and the atmospheric pressure sensor 16, and performs calculation of a drive time (injection pulse width) of the fuel injection valve 2 in accordance with the operating condition of the engine 1, as described above, and inputs the injection pulse width to the injection pulse width command unit 36 and transmits the injection pulse width together with a drive waveform calculated by the fuel injection valve drive waveform command unit 35 to the drive circuit 34.

The drive circuit 34 controls a voltage applied to the coil 28 of the fuel injection valve 2, and supplies current. The ECU 3 communicates with the drive circuit 34 via the injection pulse width command unit 36 and the fuel injection valve drive waveform command unit 35, and is capable of switching as desired the drive current generated by the drive circuit 34, in accordance with the pressure of the fuel to be supplied to the fuel injection valve 2 and the operating condition of the engine 1.

Figure 4A:
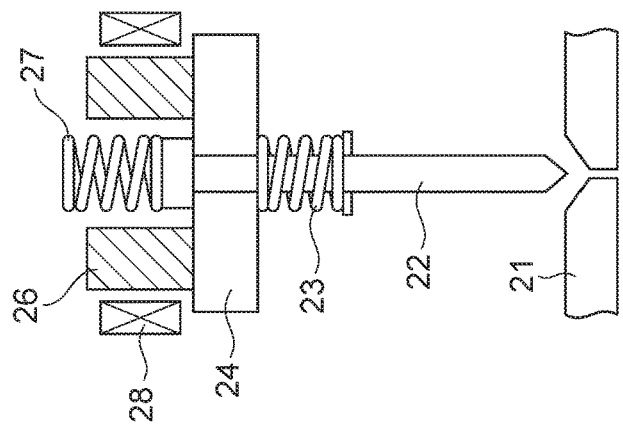
FIGS. 4A to 4C are schematic diagrams schematically illustrating a valve displacement of the fuel injection valve illustrated in FIG. 1.
Figure 4B:
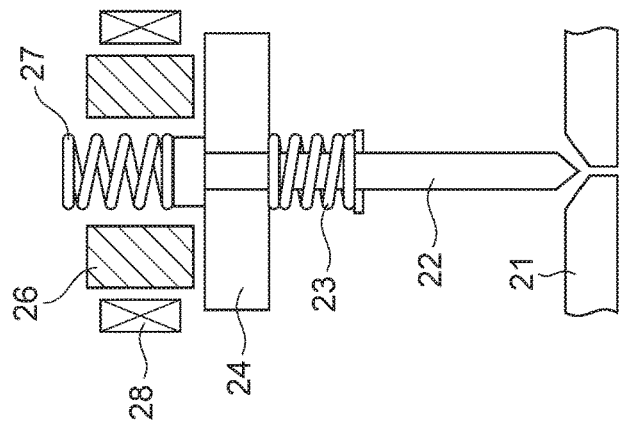
Figure 4C:
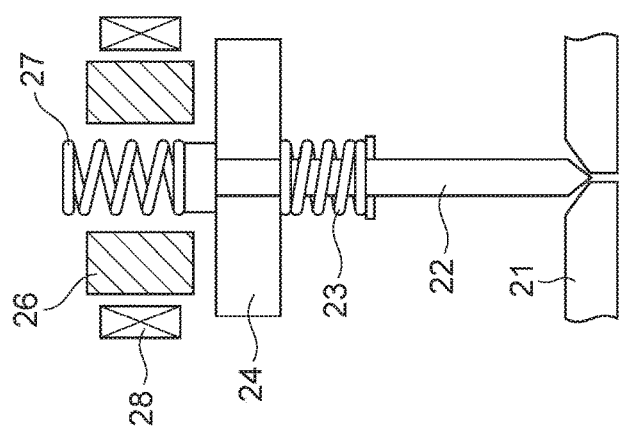

In this embodiment, a state is referred to as a maximum lift state (also referred to as a full lift state) (FIG. 4(C)) in which the coil 28 is supplied with the drive current, and the valve body 22 is separated from the valve seat 21 to open the valve (FIG. 4(A)), and then the anchor 24 collides with the magnetic core 26 and the valve body 22 is in a maximum height position. A state is referred to as an intermediate lift state (also referred to as a half lift state) (FIG. 4(B)) in which the valve body 22 is in a position lower than the maximum height position, which is a state before the anchor 24 collides with the magnetic core 26. The ECU 3, in a case where a lot of fuel injection quantity is required, controls the injection pulse width and the drive current or a drive voltage such that the valve body 22 is in the maximum lift state. The ECU 3, in a case where a little fuel injection quantity is required, controls the injection pulse width and the drive current or the drive voltage such that the valve body 22 is in the intermediate lift state.

A time when the valve body 22 is separated from the valve seat 21 and starts fuel injection, is referred to as a valve opening delay time of the fuel injection valve 2. A time when the valve body 22 is seated on the valve seat 21 and stops fuel injection, is referred to as a valve closing delay time of the fuel injection valve 2. The valve opening delay time or the valve closing delay time fluctuates due to various causes such as an error in a mechanical shape of each of the fuel injection valve 2, an error in current, an error in voltage, and an error in pressure and temperature of the fuel. For that reason, by detecting the valve opening delay time or the valve closing delay time, it is possible to specify the valve opening delay time or the valve closing delay time of the fuel, and know an error from a target valve opening time or a target valve closing time, that is, an error of the fuel injection quantity. Further, on the basis of the valve opening delay time or the valve closing delay time, the injection pulse width and the drive current or the drive voltage can be corrected to reduce the error of the fuel injection quantity. For example, a correction amount of the injection pulse width and the drive current or the drive voltage may be calculated by multiplying a predetermined coefficient and the valve opening delay time or the valve closing delay time together, or a correction amount of the injection pulse width and the drive current or the drive voltage may be calculated by subtracting a predetermined constant from the valve opening delay time or the valve closing delay time.

Figure 5:
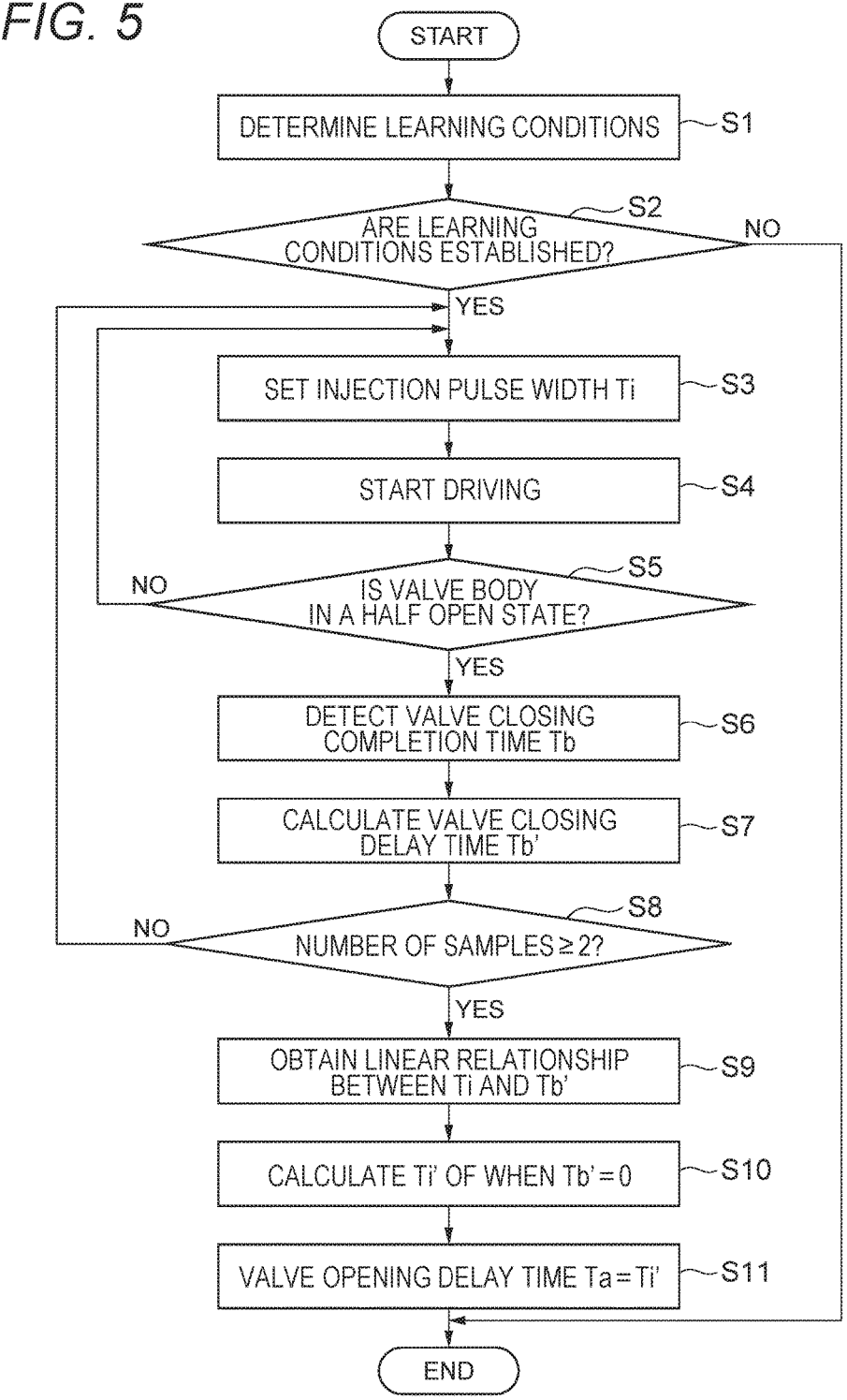
FIG. 5 is a flowchart describing a procedure for calculating an estimated valve opening delay time of the fuel injection valve by an ECU illustrated in FIG. 1.

FIG. 5 is a flowchart describing a procedure for calculating an estimated valve opening delay time Ta' of the fuel injection valve 2 described above by the ECU 3 illustrated in FIG. 1.

First, in step S1, it is determined whether or not an operating state of the engine 1 satisfies the following learning conditions.

Condition 1: engine rotation speed is in an idling state.
Condition 2: fuel pressure is within a predetermined range.
Condition 3: exhaust temperature is within a predetermined range.
Condition 4: fuel temperature is within a predetermined range.
Condition 5: atmospheric pressure is equal to or greater than a predetermined value.

When the conditions 1 to 5 are all established, it is determined that the learning conditions are established, that is, various environment conditions such as temperature and fuel pressure conditions are established (step S2), minute injection quantity learning is started.

In step S3, an injection pulse width Ti is calculated (set). Here, one fuel injection is split into a plurality of fuel injections and multistage injection is implemented. The ECU 3 changes a pulse width over a plurality of cycles, the pulse width being any one of split injection pulse widths obtained by splitting an injection pulse width of one combustion cycle into a plurality of split injection pulse widths (that is, an injection quantity ratio of any one of injection pulse widths obtained by splitting the injection pulse width of one combustion cycle into the plurality of split injection pulse widths), and sets an injection pulse width with which the fuel injection valve 2 is controlled in the intermediate lift state, as the injection pulse width Ti. More specifically, the ECU 3 splits an idle injection quantity necessary for keeping a target idle rotation speed, that is, a fuel injection quantity during idle operating, to implement minute quantity split injection; the ECU 3 changes the injection quantity ratio of each stage injection over the plurality of cycles.

Figure 6:
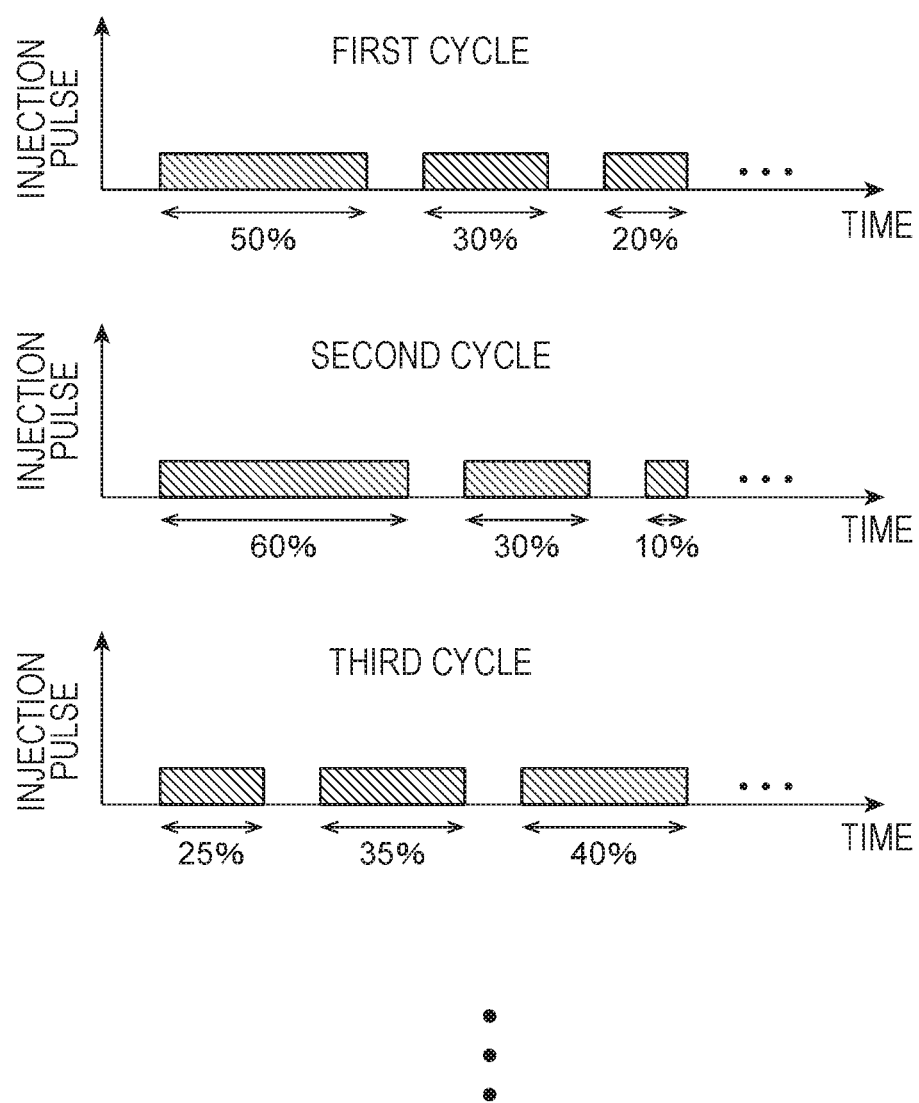
FIG. 6 is a diagram illustrating an example of a process for determining injection pulse widths by the ECU illustrated in FIG. 1.

FIG. 6 is a diagram illustrating an example of a process for determining the injection pulse width Ti by the ECU 3 illustrated in FIG. 1. As illustrated, the fuel injection quantity during idle operating is split into three fuel injection quantities, and injection quantity ratio of any one or more of the three fuel injection quantities are changed over three cycles. For example, in a case where the injection quantity ratios of the first cycle are respectively set to 50%, 30%, and 20%, the injection quantity ratios of the second cycle may be respectively changed to 60%, 30%, and 10%, and the injection quantity ratios of the third cycle may be respectively changed to 25%, 35%, and 40%. Incidentally, the injection quantity ratios only need to be in the intermediate lift state in any one of the injections, and the ratios and the number of times are not limited to the illustrated example.

Figure 7:
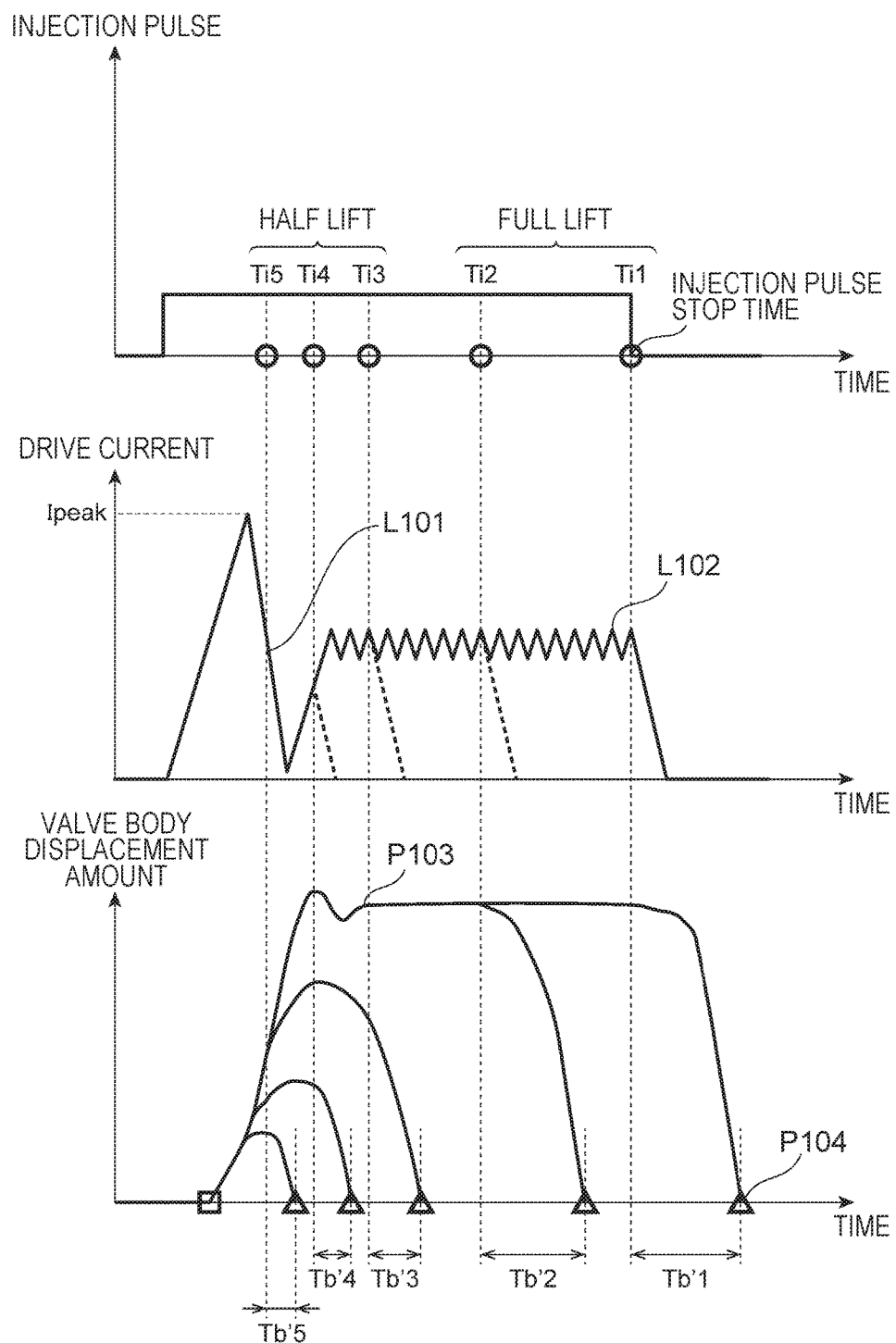
FIG. 7 is a diagram describing a relationship among an injection pulse for driving the fuel injection valve, a drive current, and a displacement amount of a valve body.

FIG. 7 is a diagram describing a relationship among an injection pulse for driving the fuel injection valve 2, the drive current, and a displacement amount of the valve body 22. When the injection pulse is input to the drive circuit 34 of the ECM 17, the drive circuit 34 applies a high voltage to the coil 28 of the fuel injection valve 2 from a high voltage source boosted to a higher voltage than the battery voltage, and supply is started of the drive current to the coil 28. When the drive current reaches a maximum current value Ipeak, the drive circuit 34 stops applying the high voltage. After that, the voltage applied is made to be equal to or less than zero volts to decrease the current value (see L101 in FIG. 7). When the current value is less than zero, the drive circuit 34 performs control by switching application of the battery voltage to make a predetermined current (see L102 in FIG. 7).

In step S4 illustrated in FIG. 5, as described above, on the basis of the injection pulse width Ti calculated in step S3, supply is started of the drive current to the fuel injection valve 2 via the drive circuit 34, and the valve body 22 is driven in the valve opening direction.

According to such a supply current profile, the fuel injection valve 2 is driven. As illustrated in FIG. 7, generally, lift of the valve body 22 is started between applying the high voltage and reaching the maximum current value, and after that, the valve body 22 reaches a target lift position. After reaching the target lift position, due to collision between the anchor 24 and the magnetic core 26, the valve body 22 performs a bounce motion, and due to magnetic attraction force generated by a holding current (see L102 in FIG. 7), the valve body 22 stops at a predetermined target lift and is in a stable valve opening state (see P103 in FIG. 7). After that, when the injection pulse is turned OFF and supply of the drive current is stopped, the valve body 22 moves in the valve closing direction to be in the valve closing completion state (see P104 in FIG. 7).

Figure 8:
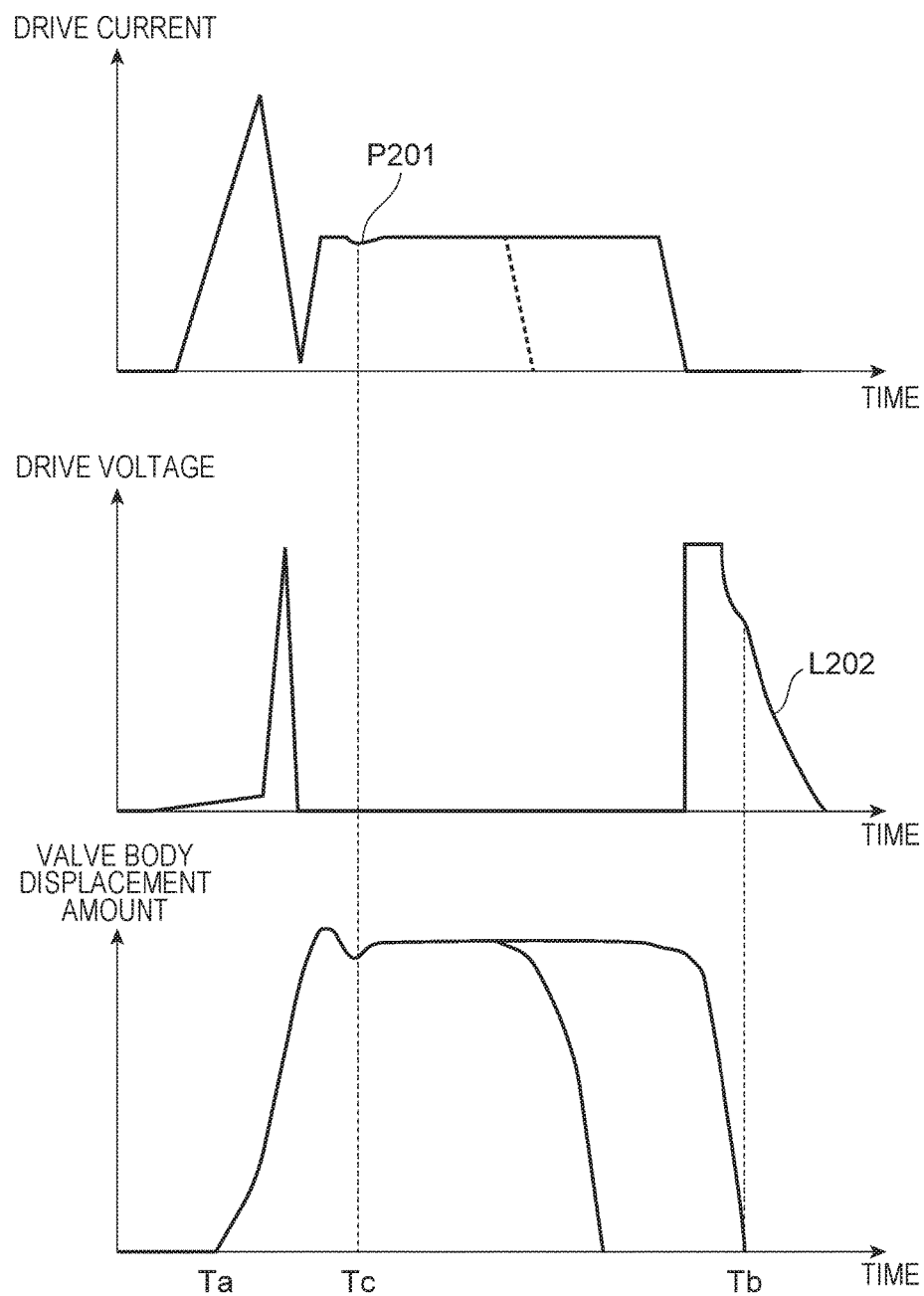
FIG. 8 is a diagram describing a process for determining the intermediate lift state and a process for detecting a valve closing completion time by the ECU illustrated in FIG. 1.

Subsequently, in step S5, as illustrated in FIG. 8, depending on whether or not an inflection point (P201 in FIG. 8) appears when the drive current temporarily shut off is recovered and is held in a constant current value, it is determined whether or not the valve body 22 of the fuel injection valve 2 is in a half open state. In a case where the valve body 22 of the fuel injection valve 2 is in a full open state, acceleration of the valve body 22 suddenly changes due to the collision between the anchor 24 and the magnetic core 26, so that the inflection point can be confirmed by differentiating the drive current twice, for example. In a case where an answer in step S5 is positive (YES), the process proceeds to step S6, and in a case where the answer is negative (NO), the process returns to step S3.

Next, in step S6, when electrification to the coil 28 is shut off, the injection pulse is turned OFF and valve closing operation of the fuel injection valve 2 is started, and a time is detected as a valve closing completion time Tb, the time corresponding to the inflection point (obtained by differentiating twice, for example) in a process in which a tail voltage (see L202 in FIG. 8) generated by residual magnetic flux decreases toward zero volts.

Next, in step S7, a difference between the valve closing completion time Tb detected in step S6 and an injection pulse stop time (here, the same value as the injection pulse width) Ti, is calculated as a valve closing delay time Tb'. Specifically, the valve closing delay time Tb' is calculated by the following equation (1).

[Mathematical Equation 1]

$$Tb' = Tb - Ti \qquad (1)$$

In step S8, it is determined whether or not the number of samples of valve closing delay time Tb' calculated in step S7 is two or more. In a case where an answer in step S7 is positive (YES), the process proceeds to step S9, and in a case where the answer is negative (NO), the process returns to step S3.

Figure 9:
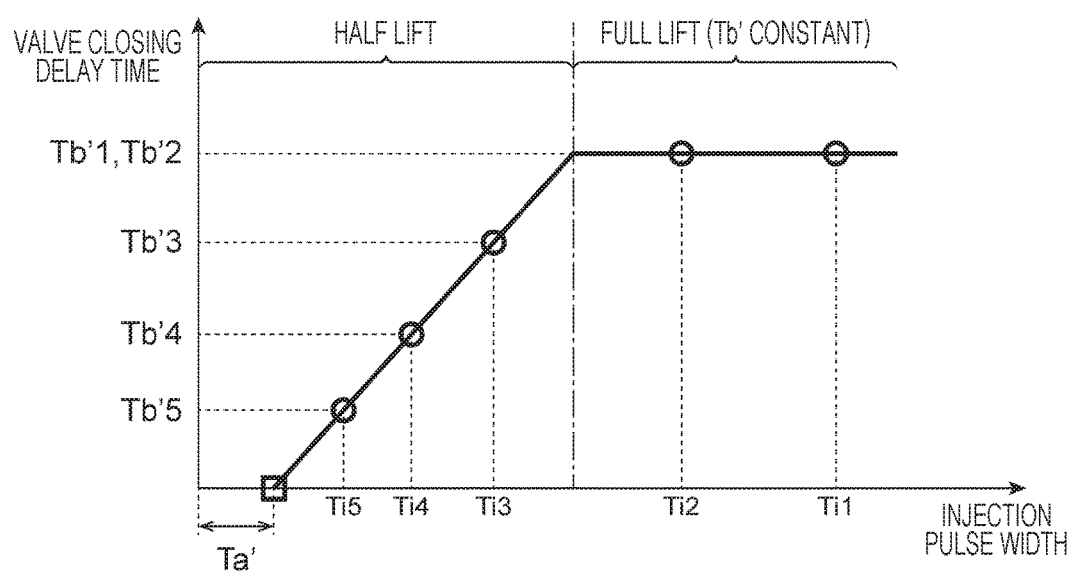
FIG. 9 is a diagram illustrating an example of a method for calculating the estimated valve opening delay time by the ECU illustrated in FIG. 1.

Next, in step S9, as illustrated in FIG. 9, by setting the injection pulse width Ti on the horizontal axis and setting the valve closing delay time Tb' corresponding to each injection pulse width Ti on the vertical axis, parameters a and b of a linear approximation equation (Tb'=aTi+b) are calculated.

Incidentally, Ti1, Ti2, Ti3, Ti4, Ti5, Tb'1, Tb'2, Tb'3, Tb'4, and Tb'5 of FIG. 9 correspond to those in FIG. 7. For example, in a case where three sets of the injection pulse width and the valve closing delay time, (Ti5, Tb'5), (Ti4, Tb'4), and (Ti3, Tb'3) are taken, the linear approximation equation is calculated by the following equations (2) to (6).

[Mathematical Equation 2]

$$F(a, b) = \qquad (2)$$
$$(a \times Ti5 + b - Tb'5)^2 + (a \times Ti4 + b - Tb'4)2 + (a \times Ti3 + b - Tb'3)^2$$

$$dF/da = 2 \times Ti5 \times (a \times Ti5 + b - Tb'5) + \qquad (3)$$
$$2 \times Ti4 \times (a \times Ti4 + b - Tb'4) + 2 \times Ti3 \times (a \times Ti3 + b - Tb'3) = 0$$

$$a \times (Ti5^2 + Ti4^2 + Ti3^2) + b \times (Ti5 + Ti4 + Ti3) = \qquad (4)$$
$$Ti5 \times Tb'5 + Ti4 \times Tb'4 + Ti3 \times Tb'3$$

$$dF/db = 2 \times (a \times Ti5 + b - Tb'5) + \qquad (5)$$
$$2 \times (a \times Ti4 + b - Tb'4) + 2 \times (a \times Ti3 + b - Tb'3) = 0$$

$$a \times (Ti5 + Ti4 + Ti3) + 3 \times b = Tb'5 + Tb'4 + Tb'3 \qquad (6)$$

Then, by the equation (4) and the equation (6) described above, the parameters a and b representing a linear relationship between the injection pulse width Ti and the valve closing delay time Tb' can be calculated.

Next, in step S10, by using the linear approximation equation calculated in step S9, an injection pulse width Ti' is obtained of when the valve closing delay time Tb' is 0, that is, an intersection of an approximation straight line and the horizontal axis. Specifically, the injection pulse width Ti' is calculated by the following equation (7).

[Mathematical Equation 3]

$$Ti' = |b/a| \qquad (7)$$

The injection pulse width Ti' thus calculated is an injection pulse width with which the valve closing operation of the fuel injection valve 2 is not detected and the valve closing operation cannot be executed. That is, the injection pulse width Ti' is a maximum injection pulse width with which the valve body 22 of the fuel injection valve 2 is not opened, and is an injection pulse width equal to a valve opening start time.

Therefore, in step S11, the injection pulse width Ti' is determined as an estimated value (estimated valve opening delay time Ta') of the valve opening delay time Ta.

As described above, in a conventional technology, it is necessary to detect waveform change of the drive current or the drive voltage to obtain the valve opening delay time Ta of the fuel injection valve 2. However, motion of the fuel injection valve 2 is not abrupt during valve opening, and the current is detected together with noise, so that it is difficult to obtain with high accuracy the valve opening delay time. Also, to obtain the inflection point of the drive current or the drive voltage, a drive waveform is required with an inclination as small as possible; however, if the inclination is too small, there is a possibility that the fuel injection valve 2 is not opened, and the fuel injection is unstable.

The fuel injection control device (ECU) 3 of this embodiment, in a cycle of the engine 1 satisfying the learning conditions, splits one fuel injection into the plurality of fuel injections to implement the multistage injection; the ECU 3 changes the injection quantity ratio of any one or more of the fuel injections over the plurality of cycles, and uses the injection pulse widths with which the fuel injection valve 2 is controlled in the intermediate lift state, and the valve closing delay times corresponding to the injection pulse widths (that is, obtained when the fuel injection valve 2 is operated with the injection pulse widths), to estimate the valve opening delay time of the fuel injection valve 2. For that reason, regardless of whether or not the valve opening delay time Ta can be detected, the valve opening delay time can be obtained reliably and with high accuracy.

Since the injection quantity ratio is changed over the plurality of cycles and the injection pulse width Ti is determined, a sufficient time can be given for recovery of the voltage boosted for each cycle, so that stable valve opening operation can be secured when the fuel injection is continuously performed.

In the linear approximation equation obtained by setting the injection pulse width and the valve closing delay time to the horizontal axis and the vertical axis respectively, to estimate the injection pulse width of when the valve closing delay time is 0 as the valve opening delay time of the fuel injection valve 2, a calculation load can be extremely reduced.

Figure 10:
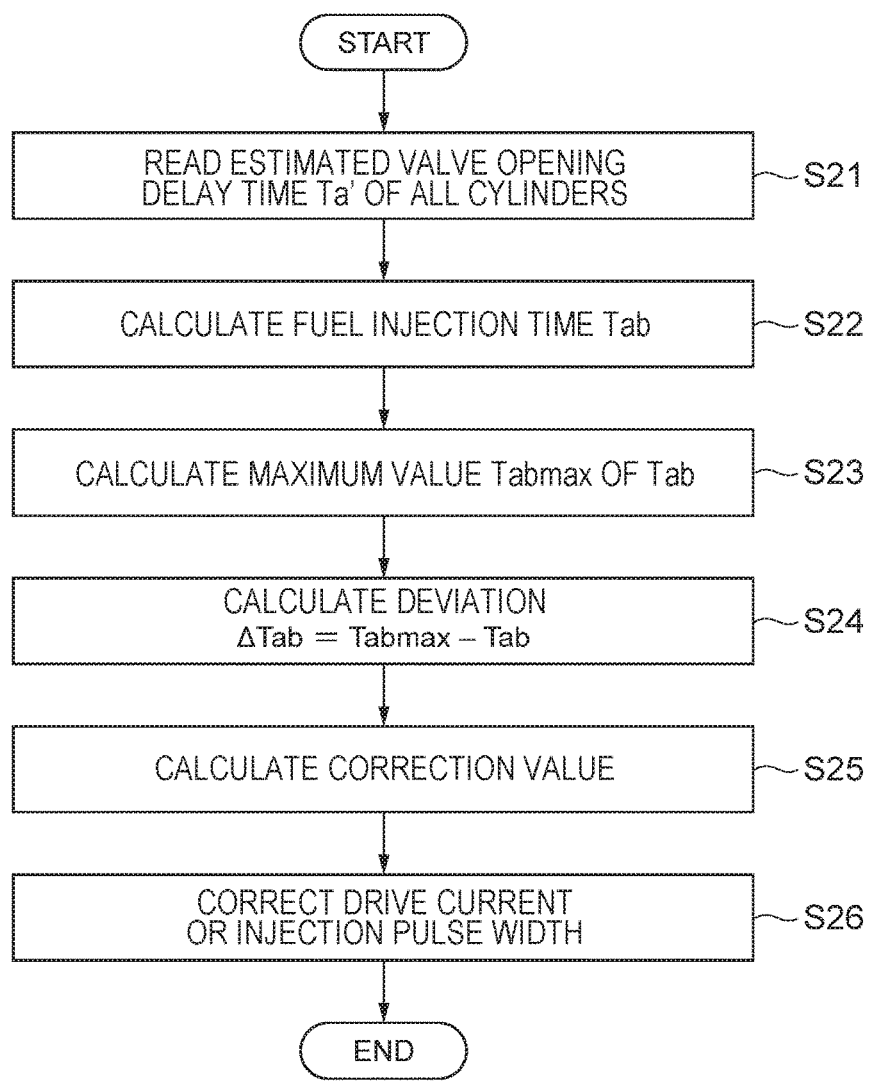
FIG. 10 is a flowchart describing a procedure for controlling fuel injection using fuel injection quantity correction by the ECU illustrated in FIG. 1.

FIG. 10 is a flowchart describing a procedure for controlling fuel injection using fuel injection quantity correction by the ECU 3 illustrated in FIG. 1, and is a flowchart describing a procedure for correcting an injection quantity error of a plurality of the fuel injection valves 2 provided in the engine 1, on the basis of the estimated valve opening delay time Ta' obtained by the calculation procedure illustrated in FIG. 5.

First, in step S21, the estimated valve opening delay time Ta' is read of the fuel injection valve 2 provided in each cylinder of the engine 1.

Subsequently, in step S22, on the basis of the valve closing completion time Tb (see FIG. 8) and the estimated valve opening delay time Ta', a fuel injection time Tab that determines one injection quantity is calculated. Specifically, the fuel injection time Tab is calculated by the following equation (8).

[Mathematical Equation 4]

$$Tab = Tb - Ta' \qquad (8)$$

Next, in step S23, a maximum value Tabmax is calculated of the fuel injection time Tab of the fuel injection valve 2 of each cylinder, and is set as a target injection time of all the fuel injection valves 2. Specifically, the maximum value Tabmax is calculated by the following equation (9).

[Mathematical Equation 5]

$$Tabmax = \max(Tab1, Tab2, Tab3, Tab4 \ldots) \qquad (9)$$

Next, in step S24, an error (deviation) ΔTab between the fuel injection time Tab to be corrected and the maximum value Tabmax is calculated as a correction reference value. Specifically, the correction reference value ΔTab is calculated by the following equation (10).

[Mathematical Equation 6]

$$\Delta Tab = Tabmax - Tab \qquad (10)$$

Next, in step S25, on the basis of the correction reference value ΔTab and a predetermined correction coefficient G1, a correction value ΔTp of the drive current is calculated. Specifically, the correction reference value ΔTp is calculated by the following equation (11).

[Mathematical Equation 7]

$$\Delta Tp = \Delta Tab \times G1 \qquad (11)$$

Then, in step S26, in accordance with the correction value ΔTp of the drive current calculated in step S25, correction is performed to increase a boost application time from drive current supply start to reaching the maximum value.

In this way, the fuel injection control device (ECU) 3 of this embodiment calculates the fuel injection time Tab of the fuel injection valve 2 of each cylinder from the estimated valve opening delay time Ta' and the valve closing completion time Tb detected, and on the basis of the fuel injection time Tab, corrects the drive current to be supplied to each fuel injection valve 2. For that reason, by switching ON/OFF of a current switch of the drive circuit 34 of the ECM 17, the drive current to be supplied to the fuel injection valve 2 of each cylinder can be easily corrected such that the fuel injection times of the cylinders coincide with each other.

For the fuel injection valve having a longer estimated valve opening delay time Ta' than that of another fuel injection valve, that is, having greater spring load than that of the other fuel injection valve, correction is performed to increase the boost application time of the drive current. For that reason, by giving valve opening force greater than before correction, injections of all the fuel injection valves 2 can be reliably executed, so that a highly reliable fuel injection device can be provided, and as a result, the injection quantity error (machine difference variation) of each fuel injection valve 2 disposed in the engine 1 can be suppressed and a minute injection quantity can be accurately injected.

Incidentally, in the embodiment described above, in step S25, the correction value $\Delta Tp$ of the drive current is calculated, and in step S26, correction is performed to increase the boost application time from drive current supply start to reaching the maximum value, for the fuel injection valve having a longer estimated valve opening delay time Ta' than that of the other fuel injection valve, on the basis of the correction value $\Delta Tp$; however, for example, in step S25, on the basis of the correction reference value $\Delta Tab$ and a predetermined correction coefficient G2, an injection pulse width correction value $\Delta Ti$ ($=\Delta Tab \times G2$) may be calculated, and in step S26, correction may be performed to increase the injection pulse width, for the fuel injection valve having a longer estimated valve opening delay time Ta' than that of the other fuel injection valve, on the basis of the correction value $\Delta Ti$.

According to this configuration, even the drive circuit 34 that cannot control the drive current individually can adjust the minute fuel quantity by correcting the injection pulse width, so that the injection quantity error of each fuel injection valve 2 can be suppressed.

[Second Embodiment]

A second embodiment is a modification based on the first embodiment, and is the same as the first embodiment except as described below.

In the first embodiment, in the cycle of the engine 1 satisfying the learning conditions, one fuel injection is split into the plurality of fuel injections, and the injection quantity ratio of any one or more of the fuel injections are changed over the plurality of cycles (in the illustrated example, three cycles), and the injection pulse widths (split injection pulse widths) with which the fuel injection valve 2 is controlled in the intermediate lift state are set on the horizontal axis, and the valve closing delay times corresponding to the injection pulse widths are set on the vertical axis, whereby the linear approximation equation is obtained, and the valve opening delay time is estimated by using the linear approximation equation.

Instead of this, the injection pulse width of one cycle may be split into the plurality of injection pulse widths, and the injection quantity ratio of any one of the injection pulse widths may be changed over at least two cycles, and the injection pulse widths (split injection pulse widths) with which the fuel injection valve 2 is controlled in the intermediate lift state may be set on the horizontal axis, and the valve closing delay times corresponding to the injection pulse widths may be set on the vertical axis, whereby the linear approximation equation may be obtained.

Figure 11:
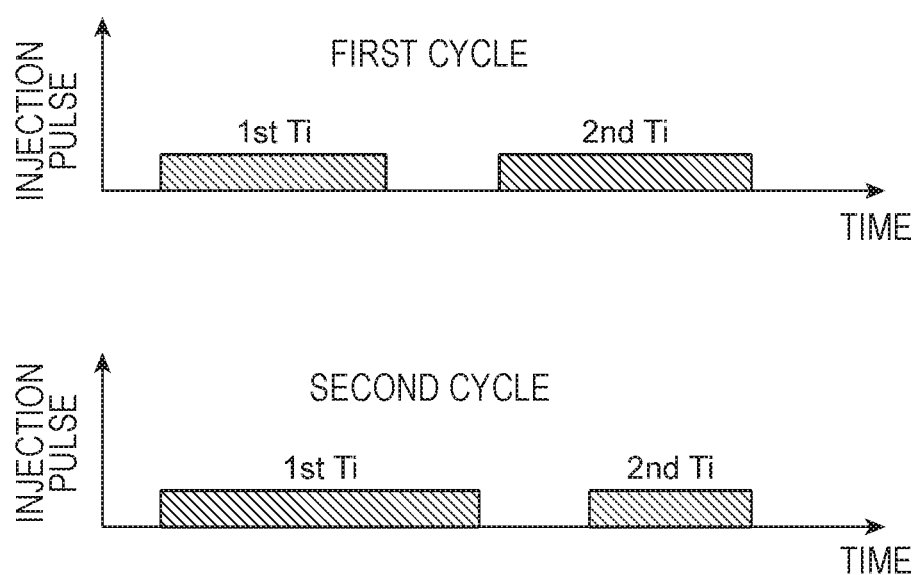
FIG. 11 is a diagram illustrating an example of a process for determining injection pulse widths in a second embodiment of the fuel injection control device according to the present invention.

FIG. 11 is a diagram illustrating an example of a process for determining injection pulse widths Ti in a second embodiment of the fuel injection control device according to the present invention. In the second embodiment, the injection pulse width of one cycle is split into two injections, and the quantity ratio of any one or both injections are changed over two cycles. In a case where there is one or more injection pulse widths with which the fuel injection valve 2 is controlled in the intermediate lift state among these four injection pulses, these injection pulse widths may be set on the horizontal axis, and the valve closing delay times corresponding to the injection pulse widths are set on the vertical axis, whereby the linear approximation equation may be obtained.

According to the second embodiment, the valve opening delay time of the fuel injection valve 2 can be estimated by using the injection pulse widths in a few cycles and the valve closing delay times obtained when the fuel injection valve 2 is operated with the injection pulse widths, so that the cycles required for estimation can be reduced, and correction of the injection quantity error can be performed faster.

[Third Embodiment]

This embodiment is a modification based on the first embodiment or the second embodiment, and is the same as the first embodiment or the second embodiment except as described below.

In the second embodiment, the injection pulse width of one cycle is split into the plurality of injection pulse widths, and the injection quantity ratio of any one of the injection pulse widths is changed over at least two consecutive cycles.

On the other hand, one injection quantity ratio may be changed in two non-consecutive cycles.

Figure 12:
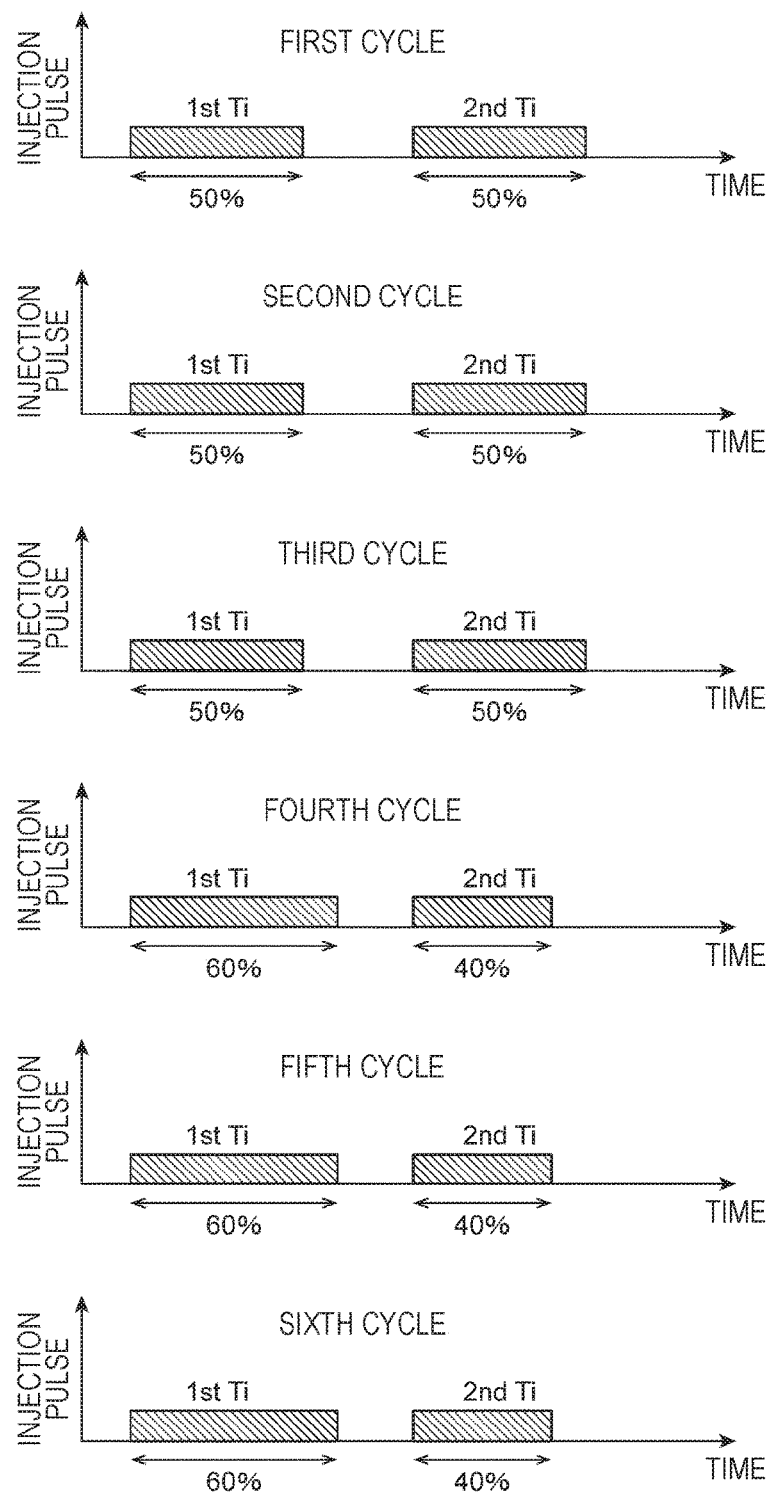
FIG. 12 is a diagram illustrating an example of a process for determining injection pulse widths in a third embodiment of the fuel injection control device according to the present invention.

FIG. 12 is a diagram illustrating an example of a process for determining injection pulse widths Ti in a third embodiment of the fuel injection control device according to the present invention. In the third embodiment, the injection quantity ratios are not changed from the first cycle to the third cycle, and any one of the injection quantity ratios is changed from the fourth cycle, and the injection quantity ratios of the fifth cycle and the sixth cycle are the same as the injection quantity ratios of the fourth cycle. Then, the linear approximation equation is obtained by using the injection pulse widths of the third cycle and the sixth cycle, and the estimated valve opening delay time is calculated.

According to the third embodiment, by using the valve closing delay time obtained when the fuel injection valve 2 is operated with the same injection pulse widths, the same combination data increases, and by taking an average value of the data, a ripple of the injection quantity caused by change of an injection command decreases, so that the valve opening delay time estimation accuracy can be improved.

[Fourth Embodiment]

This embodiment is a modification based on the first embodiment or the second embodiment, and is the same as the first embodiment or the second embodiment except as described below.

In the embodiment described above, in the cycle of the engine 1 satisfying the learning conditions, one fuel injection is split into the plurality of fuel injections, and the injection quantity ratio of any one or more of the fuel injections are changed over the plurality of cycles, and in the injection pulse widths with which the fuel injection valve 2 is controlled in the intermediate lift state, the linear approximation equation is obtained by using only one injection pulse width in one cycle.

Instead of this, the linear approximation equation may be obtained by using a plurality of different injection pulse widths in one combustion cycle (in other words, a plurality of split injection pulse widths out of the plurality of different split injection pulse widths obtained by splitting the injection pulse width of one combustion cycle).

Figure 13:
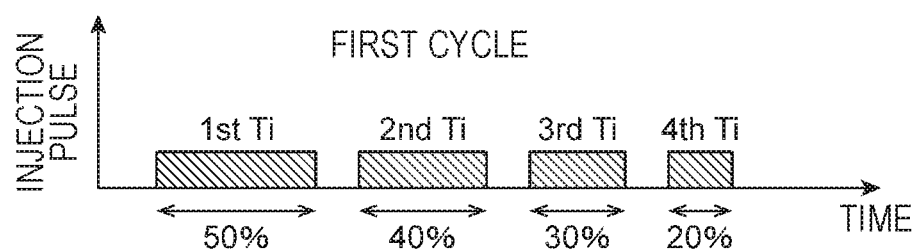
FIG. 13 is a diagram illustrating an example of a process for determining injection pulse widths in a fourth embodiment of the fuel injection control device according to the present invention.

FIG. 13 is a diagram illustrating an example of a process for determining injection pulse width in a fourth embodiment of the fuel injection control device according to the present invention. In the fourth embodiment, in a case where the injection pulse width of one cycle is split into the plurality of injection pulse widths (for example, four-stage injection) and there is one or more injection pulse widths with which the fuel injection valve 2 is controlled in the intermediate lift state, these injection pulse widths may be set on the horizontal axis, and the valve closing delay times corresponding to the injection pulse widths may be set on the vertical axis, whereby the linear approximation equation may be obtained.

According to the fourth embodiment, the estimated valve opening delay time can be calculated in one cycle, and the valve opening delay time of the fuel injection valve 2 can be estimated by using injection pulses having a small fuel pressure fluctuation in a fewer cycles, so that both injection quantity error correction efficiency and correction accuracy can be improved.

Incidentally, the embodiments described above have been applied to the fuel injection valve 2 mounted on an ignition type internal-combustion engine; however, it is obvious that the embodiments may be applied to the fuel injection valve 2 mounted on a compression ignition type internal-combustion engine (diesel engine or premixed compression ignition). Also, the embodiments described above have been applied to the fuel injection valve 2 that directly injects the fuel into the combustion chamber of the internal-combustion engine; however, it goes without saying that the embodiments may be applied to a port injection type fuel injection valve mounted on an intake pipe outside an air intake valve.

Incidentally, the present invention is not limited to the embodiments described above, and includes various modifications. For example, the embodiments described above have been described in detail for describing the present invention clearly, and are not necessarily limited to those including all the configurations described. A part of the configuration of an embodiment can be replaced with the configuration of another embodiment, and a part of the configuration of an embodiment can be added to the configuration of another embodiment. For a part of the configuration of each embodiment, it is possible to add, remove, and replace another configuration.

Control lines and information lines considered to be necessary have been indicated, and all the control lines and information lines are not necessarily indicated on the product. In practice, it may be considered that almost all the configurations are connected to each other.

REFERENCE SIGNS LIST 1 internal-combustion engine (engine)
2 fuel injection valve
3 engine control unit (ECU) (fuel injection control device)
4 fuel tank
5 low pressure fuel pump
6 high pressure fuel pump
7 fuel supply device
8 crank angle sensor
9 fuel line
10 combustion chamber
14 fuel temperature sensor
15 exhaust temperature sensor
16 atmospheric pressure sensor
17 engine control module (ECM)
21 valve seat
22 valve body
23 zero spring
24 anchor
26 magnetic core
27 spring
28 coil

The invention claimed is:

1. A fuel injection control device with which a fuel injection valve is controlled in an intermediate lift state, the fuel injection control device estimating a valve opening delay time of the fuel injection valve on the basis of a plurality of valve closing delay times, the plurality of valve closing delay times being obtained when the fuel injection valve is operated with injection pulse widths that are different injection pulse widths from each other and with which the fuel injection valve is in the intermediate lift state.

2. The fuel injection control device according to claim 1, wherein the fuel injection control device estimates the valve opening delay time on the basis of a plurality of valve closing delay times, the plurality of valve closing delay times being obtained when any one of a plurality of split injection pulse widths is changed over a plurality of cycles and the fuel injection valve is operated, the split injection pulse widths being obtained by splitting an injection pulse width of one combustion cycle into the plurality of split injection pulse widths.

3. The fuel injection control device according to claim 1, wherein the fuel injection control device estimates the valve opening delay time on the basis of a plurality of valve closing delay times, the plurality of valve closing delay times being obtained when an injection pulse width of one combustion cycle is split into a plurality of different split injection pulse widths and the fuel injection valve is operated.

4. The fuel injection control device according to claim 1, wherein the plurality of valve closing delay times further includes a valve closing delay time obtained when the fuel injection valve is operated with injection pulse widths that are injection pulse widths identical to each other and with which the fuel injection valve is in the intermediate lift state.

5. The fuel injection control device according to claim 1, wherein the fuel injection control device estimates the valve opening delay time from a linear relationship between each of the injection pulse widths and a valve closing delay time corresponding to each of the injection pulse widths.

6. The fuel injection control device according to claim 5, wherein the fuel injection control device estimates an injection pulse width of when the valve closing delay time is 0 as the valve opening delay time, in a linear approximation equation obtained from the linear relationship between each of the injection pulse widths and the valve closing delay time corresponding to each of the injection pulse widths.

7. The fuel injection control device according to claim 1, wherein the fuel injection control device estimates, for a plurality of the fuel injection valves, a valve opening delay time of each of the fuel injection valves, and corrects a drive current to be supplied to each of the fuel injection valves on the basis of the valve opening delay time estimated.

8. The fuel injection control device according to claim 7, wherein the fuel injection control device corrects the drive current so as to increase a boost application time from drive current supply start to reaching a maximum value, for a fuel injection valve having a longer valve opening delay time estimated than a valve opening delay time estimated of another fuel injection valve.

9. The fuel injection control device according to claim 1, wherein the fuel injection control device estimates, for a plurality of the fuel injection valves, a valve opening delay time of each of the fuel injection valves, and corrects an injection pulse width of each of the fuel injection valves on the basis of the valve opening delay time estimated.

10. The fuel injection control device according to claim 9, wherein the fuel injection control device corrects the injection pulse width so as to increase the injection pulse width, for a fuel injection valve having a longer valve opening delay time estimated than a valve opening delay time estimated of another fuel injection valve.

11. A fuel injection control device with which a plurality of fuel injection valves is controlled in an intermediate lift state, the fuel injection control device estimating a valve opening delay time of each of the fuel injection valves on the basis of a plurality of valve closing delay times, the plurality of valve closing delay times being obtained when the fuel injection valves are operated with injection pulse widths that are different injection pulse widths from each other and with which the fuel injection valves are in the intermediate lift state, and correcting a drive current so as to increase a boost application time from drive current supply start to reaching a maximum value, for a fuel injection valve having a longer valve opening delay time estimated than a valve opening delay time estimated of another fuel injection valve.

12. A fuel injection control device with which a plurality of fuel injection valves is controlled in an intermediate lift state, the fuel injection control device estimating a valve opening delay time of each of the fuel injection valves on the basis of a plurality of valve closing delay times, the plurality of valve closing delay times being obtained when the fuel injection valves are operated with injection pulse widths that are different injection pulse widths from each other and with which the fuel injection valves are in the intermediate lift state, and correcting the injection pulse widths so as to increase each of the injection pulse widths, for a fuel injection valve having a longer valve opening delay time estimated than a valve opening delay time estimated of another fuel injection valve.

* * * * *